O. GRAHAM.
Farm Gate.
No. 70,548.
Patented Nov. 5, 1867.
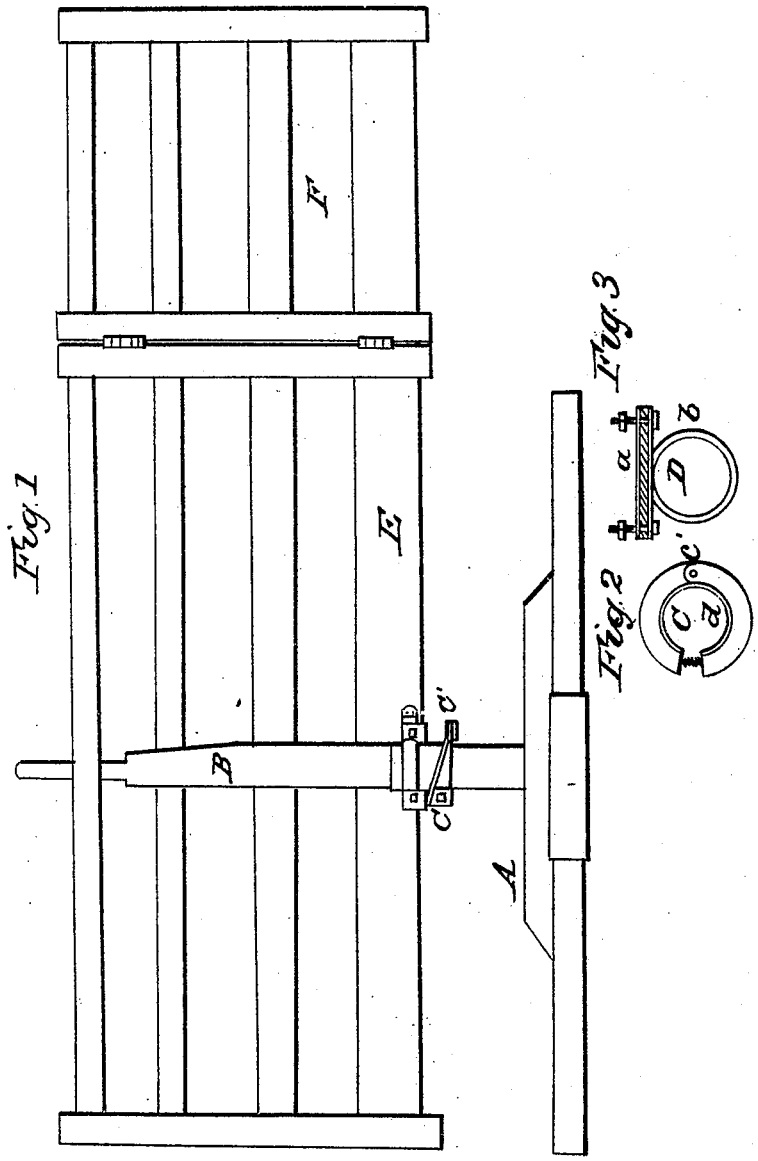

United States Patent Office.

ORSON GRAHAM, OF LIMA, NEW YORK.

Letters Patent No. 70,548, dated November 5, 1867.

---

IMPROVEMENT IN FARM-GATES.

---

*The Schedule referred to in these Letters Patent and making part of the same.*

---

TO ALL WHOM IT MAY CONCERN:

Be it known that I, ORSON GRAHAM, of Lima, in the county of Livingston, and State of New York, have invented a new and useful Improvement in Farm-Gates, and I do hereby declare that the following is a full, clear, and exact description of the construction and operation of the same, reference being had to the annexed drawings, making a part of this specification, in which—

Figure 1 is a side elevation of the whole gate.
Figure 2 is a bird's-eye view of the collar C.
Figure 3 is a bird's-eye view of the collar D.

The letters of reference refer to the same parts in each figure.

The object of my invention consists in making a farm-gate that can be easily made and readily adjusted, so that it may be raised above the snow in winter, or raised to allow small animals to pass under it; also providing it with a hinged joint, so that the end may be folded back to the other part for the purpose of balancing the gate upon the post; and the part thus hinged may be used as a small gate to allow persons or single animals to pass through without opening the whole gate.

To enable others skilled in the art to make and use my invention, I will proceed to describe its mode of construction and operation.

A is the base that supports the post. It may be made by laying two pieces of timber across each other, and making a hole through them to insert the lower end of the post into, or, when preferred, any other device may be used to hold the post; or the post may be set in the ground. B is the post. It is made round. The lower end is inserted into the base to hold it perpendicular, or it may be set in the ground, or may be fastened in any way desired. The part above the support must be longer than the height of gate required. The top may be made smaller, so as to pass through the upper part of the gate, and constitute a pivot to hold the gate and allow it to turn upon the pivot. The other part should be nearly uniform in size, so that the collar C may be readily fastened to it at any required distance above the support. C is a collar that surrounds the post, and it sustains the gate. It is made in two parts, as shown in fig. 2, and pivoted together at $c'$, and open at the opposite side. The pivot allows it to be opened to be put on the post. The other side is held together with a bolt, so that the collar may be adjusted to different-sized posts, and be raised or lowered at will, and fastened in any required position. The collar extends enough above the inclined rim to keep the rim of D upon it while the gate is being opened and closed. By means of the screw-bolt the collar may be turned to give any required position to the inclined rim, so as to cause the gate to stop at any place required, and it may be adjusted so that the gate will not entirely close, in which case the gate may be closed by hand, and in this case the gate will open with more ease than when otherwise adjusted. This collar has an inclined rim or flange, $C'$, for the part $a$ of the collar D to rest upon. This inclined rim allows the weight of the gate to cause it to shut. This rim $C'$ may be much or little inclined, to suit the weight of the gate. D is a collar that surrounds the collar C. It is provided with a part, $a$, which may be made to suit the size of the bottom of any sized gate that may be used. This part of the collar is made to be securely fastened to the bottom of the gate. The part $b$ is made in the form of a hoop, and must be large enough to surround the collar C when it is extended to its full size, and move freely upon it. E is the gate. It may be made in any ordinary manner that will give sufficient strength. It should be hung upon the post so as to be nearly balanced, and if not sufficiently balanced, extra weight may be applied to balance it. F is a folding part of the gate. It is hinged to the gate E as shown in fig. 1. It may be made to correspond with the gate, and is made to fold back against the gate, to make the gate balance without extra weight, and it may be used as a small gate to allow persons or single or small animals to pass through.

Having thus fully described my invention, what I claim as new, and desire to secure by Letters Patent, is—

1. I claim the collar C and collar D, in combination with the gate E and folding part F, when made and used substantially as specified.

2. I claim the folding part F, when made as specified, and used in combination with the gate E, substantially as specified.

ORSON GRAHAM.

Witnesses:
JOHN L. LEWIS,
CHARLES KETCHUM.